(12) United States Patent
Wu et al.

(10) Patent No.: US 12,390,069 B2
(45) Date of Patent: Aug. 19, 2025

(54) OBSTACLE AVOIDANCE METHOD AND DEVICE FOR SELF-WALKING ROBOT, ROBOT, AND STORAGE MEDIUM

(71) Applicant: Beijing Roborock Innovation Technology Co., Ltd., Beijing (CN)

(72) Inventors: Zhen Wu, Beijing (CN); Haojian Xie, Beijing (CN); Song Peng, Beijing (CN); Yixing Wang, Beijing (CN); Zhiying Hu, Beijing (CN)

(73) Assignee: Beijing Roborock Innovation Technology Co., Ltd., Beijing (CN)

( * ) Notice: Subject to any disclaimer, the term of this patent is extended or adjusted under 35 U.S.C. 154(b) by 211 days.

(21) Appl. No.: 17/996,699

(22) PCT Filed: Jan. 8, 2021

(86) PCT No.: PCT/CN2021/070912
§ 371 (c)(1),
(2) Date: Oct. 20, 2022

(87) PCT Pub. No.: WO2021/212926
PCT Pub. Date: Oct. 28, 2021

(65) Prior Publication Data
US 2023/0225576 A1 Jul. 20, 2023

(30) Foreign Application Priority Data
Apr. 20, 2020 (CN) .......................... 202010311652.2

(51) Int. Cl.
*A47L 9/00* (2006.01)
*A47L 9/28* (2006.01)
(Continued)

(52) U.S. Cl.
CPC ............. *A47L 9/2805* (2013.01); *A47L 9/009* (2013.01); *A47L 9/2852* (2013.01);
(Continued)

(58) Field of Classification Search
CPC ...... A47L 9/2805; A47L 9/009; A47L 9/2852; A47L 11/4011; A47L 11/4061;
(Continued)

(56) References Cited

U.S. PATENT DOCUMENTS

2018/0307243 A1* 10/2018 Xia ..................... G05D 1/0274
2020/0160479 A1* 5/2020 Horesh .................... G06T 7/74
(Continued)

FOREIGN PATENT DOCUMENTS

CN 105182979 A 12/2015
CN 108344414 A 7/2018
(Continued)

OTHER PUBLICATIONS

International Search Report for PCT Patent Application No. PCT/CN2021/070912 mailed Apr. 12, 2021.
(Continued)

*Primary Examiner* — Tyler D Paige
(74) *Attorney, Agent, or Firm* — Thomas | Horstemeyer, LLP

(57) ABSTRACT

An obstacle avoidance method for a self-moving robot includes: obtaining and recording, by the self-moving robot, information about an obstacle encountered during traveling, wherein the information about the obstacle includes type information and location information of the obstacle; and receiving, by the self-moving robot, an operation instruction for a specified obstacle, wherein the operation instruction is configured for instructing the self-moving robot, when detecting an obstacle of a same type as the specified obstacle in a region range labeled with the specified obstacle, not to perform an obstacle avoidance operation on the obstacle of the same type.

5 Claims, 5 Drawing Sheets

(51) Int. Cl.
  *A47L 11/40* (2006.01)
  *G05D 1/00* (2006.01)
  *G05D 1/224* (2024.01)

(52) U.S. Cl.
  CPC ....... *A47L 11/4011* (2013.01); *A47L 11/4061* (2013.01); *G05D 1/0214* (2013.01); *A47L 2201/04* (2013.01)

(58) Field of Classification Search
  CPC .............. A47L 2201/04; A47L 9/2826; A47L 2201/06; A47L 11/00; G05D 1/0214; G05D 2101/20; G05D 2105/10; G05D 2107/40; G05D 2109/10; G05D 2111/10; G05D 1/2246; G05D 1/2247; G05D 1/243; G05D 1/622
  USPC ........................................................... 701/26
  See application file for complete search history.

(56) References Cited

U.S. PATENT DOCUMENTS

2020/0198139 A1* 6/2020 Qian .................... G05D 1/0272
2022/0270296 A1* 8/2022 He ......................... H04N 23/60
2024/0211726 A1* 6/2024 Song ....................... G06N 3/04

FOREIGN PATENT DOCUMENTS

| | | |
|---|---|---|
| CN | 10862831 A | 10/2018 |
| CN | 109709945 A | 5/2019 |
| CN | 110974088 A | 4/2020 |
| CN | 110989616 A | 4/2020 |
| CN | 111481105 A | 8/2020 |
| JP | 2016192040 A | 11/2016 |
| JP | 2017004102 A | 1/2017 |
| KR | 20180075176 A | 7/2018 |
| WO | 2019199027 A1 | 10/2019 |
| WO | 2019212174 A1 | 11/2019 |
| WO | 2019221523 A1 | 11/2019 |
| WO | 2020004834 A1 | 1/2020 |

OTHER PUBLICATIONS

First Office Action for CN Patent Application No. 202010311652.2 mailed Feb. 5, 2021.
EP21791604.8—Extended European Search Report.

* cited by examiner

OBSTACLE AVOIDANCE METHOD AND DEVICE FOR SELF-WALKING ROBOT, ROBOT, AND STORAGE MEDIUM

CROSS-REFERENCE TO RELATED APPLICATIONS

The present application is a US national phase filing under 35 U.S.C. § 371 claiming the benefit of PCT international application under PCT/CN2021/070912, which claims priority to Chinese Patent Application No. 202010311652.2, filed on Apr. 20, 2020, both which is incorporated herein by reference in their entireties.

TECHNICAL FIELD

The present disclosure relates to the field of robot control technologies, and in particular, to an obstacle avoidance method and device for a self-moving robot, a robot, and a storage medium.

BACKGROUND

With the development of artificial intelligence technologies, various intelligent robots, such as a sweeping robot, a mopping robot, a vacuum cleaner, a weeder or the like, emerge. These cleaning robots can automatically identify sweeping routes, and can also identify and record obstacle information during a cleaning process, which improves route optimization of a subsequent cleaning process. This not only frees labor force, reduces manpower costs, but also improves cleaning efficiency.

In particular, some sweeping robots equipped with cameras have a capability of identifying types of obstacles, and can adopt different obstacle avoidance policies according to different types of obstacles. However, due to uncertainties in an identification capability, an error frequently occurs in an identification result, and obstacle avoidance is automatically performed in a place where obstacle avoidance should not be performed in a cleaning route, resulting in missed sweeping in some regions and poor user experience.

SUMMARY

Embodiments of the present disclosure provide an obstacle avoidance method for a self-moving robot, applied to a robot side, including: obtaining and recording information about an obstacle encountered during traveling, wherein the information about the obstacle includes type information and location information of the obstacle; and receiving an operation instruction for a specified obstacle, wherein the operation instruction instructs, when detecting an obstacle of a same type as the specified obstacle in a region range labeled with the specified obstacle, not to perform an obstacle avoidance operation on the obstacle of the same type.

Optionally, detecting the obstacle of the same type as the specified obstacle in a region range labeled with the specified obstacle specifically includes: matching a type of a detected obstacle with a type of the specified obstacle; and if the matching succeeds, confirming that the obstacle of the same type as the specified obstacle is detected.

Optionally, detecting the obstacle of the same type as the specified obstacle in a region range labeled with the specified obstacle specifically includes: matching a type of a detected obstacle with a type of the specified obstacle; and if the matching succeeds, determining whether the obstacle is in the region range labeled with the specified obstacle; and if yes, confirming that the obstacle of the same type as the specified obstacle is detected in the region range labeled with the specified obstacle.

Optionally, receiving the operation instruction for a specified obstacle specifically includes: receiving an operation instruction for ignoring the specified obstacle sent from a user through a human-machine interaction interface.

Optionally, the operation instruction includes type information and location information of the specified obstacle.

Optionally, the method further includes: allocating, after encountering the obstacle during traveling, an identifier to the obstacle, wherein the operation instruction includes an identifier of the specified obstacle; and searching, after receiving the operation instruction for the specified obstacle, for corresponding type information and location information according to the identifier of the specified obstacle.

Optionally, the region range includes a region with a fixed size and shape and with a coordinate location of the specified obstacle as a geometric center; or a zone in which the obstacle is located, wherein the zone is automatically divided by the self-moving robot or is manually divided by a user; or all regions accessible by the self-moving robot.

An embodiment of the present disclosure provides an obstacle avoidance device for a self-moving robot, applied to a robot side, and including: an obtaining unit, configured to obtain and record information about an obstacle encountered during traveling, wherein the information about the obstacle includes type information and location information of the obstacle; and a receiving unit, configured to receive an operation instruction for a specified obstacle, wherein the operation instruction instructs, when detecting an obstacle of a same type as the specified obstacle in a region range labeled with the specified obstacle, not to perform an obstacle avoidance operation on the obstacle of the same type.

Optionally, detecting the obstacle of the same type as the specified obstacle in the region range labeled with the specified obstacle specifically includes: matching a type of a detected obstacle with a type of the specified obstacle; and if the matching succeeds, confirming that the obstacle of the same type as the specified obstacle is detected.

Optionally, detecting the obstacle of the same type as the specified obstacle in the region range labeled with the specified obstacle specifically includes: matching a type of a detected obstacle with a type of the specified obstacle; and if the matching succeeds, determining whether the obstacle is in the region range labeled with the specified obstacle; and if yes, confirming that the obstacle of the same type as the specified obstacle is detected in the region range labeled with the specified obstacle.

Optionally, receiving the operation instruction for a specified obstacle specifically includes: receiving the operation instruction for ignoring the specified obstacle sent from a user through a human-machine interaction interface.

Optionally, the operation instruction includes type information and location information of the specified obstacle.

Optionally, the device further includes: a unit, configured to: allocate, after encountering the obstacle during traveling, an identifier to the obstacle, wherein the operation instruction includes an identifier of the specified obstacle; and a unit, configured to: search, after receiving the operation instruction for the specified obstacle, for corresponding type information and location information according to the identifier of the specified obstacle.

Optionally, the region range includes a region with a fixed size and shape and with a coordinate location of the specified obstacle as a geometric center; or a zone in which the obstacle is located, wherein the zone is automatically divided by the self-moving robot or is manually divided by a user; or all regions accessible by the self-moving robot.

An embodiment of the present disclosure provides a robot, including a processor and a memory, wherein the memory stores a computer program instruction that can be executed by the processor, and the computer program instruction implements operations of the foregoing method when being executed by the processor.

An embodiment of the present disclosure provides a non-transitory computer readable storage medium, where a computer program instruction is stored, and the computer program instruction implements operations of the foregoing method when being invoked and executed by a processor.

BRIEF DESCRIPTION OF DRAWINGS

To describe the technical solutions in the embodiments of the present disclosure or in the prior art more clearly, the following briefly describes the accompanying drawings used for describing the embodiments or the prior art. Clearly, the accompanying drawings in the following description illustrates some embodiments of the present disclosure, and one of ordinary skill in the art can still derive other drawings from these accompanying drawings without creative efforts.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Clearly, the described embodiments are merely some rather than all of the embodiments of the present disclosure. Based on the embodiments of the present disclosure, one of ordinary sill in the art can obtain other embodiments without creative efforts, which all fall within the scope of the present disclosure.

It should be understood that although terms "first", "second", "third", and the like may be used in the embodiments of the present disclosure to describe . . . , the . . . should not be limited by the terms. These terms are merely used to distinguish . . . . For example, without departing from the scope of the embodiments of the present disclosure, first . . . may also be referred to as second . . . , and similarly, second . . . may also be referred to as first . . . .

Figure 1:
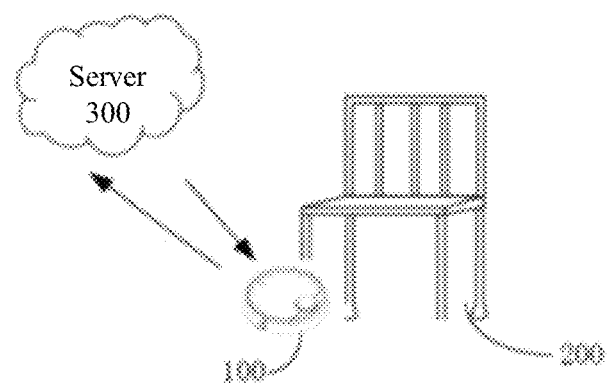
FIG. 1 is a schematic view of an application scenario according to an embodiment of the present disclosure.

An embodiment of the present disclosure provides a possible application scenario, and the application scenario includes an automatic cleaning apparatus 100, such as a sweeping robot, a mopping robot, a vacuum cleaner, and a weeder. In this embodiment, as illustrated in FIG. 1, for example, a household sweeping robot is taken as an example for description. In an operation process of the household sweeping robot, sweeping may be performed according to a preset route or an automatically planned route, but inevitably, the household sweeping robot cannot move when being stuck in some place, such as a chair 200 or a table. In this case, the sweeping robot may identify an obstacle by using a cloud server 300, a local server, or a storage system of the sweeping robot, and label the place as an obstacle location, and perform automatic obstacle avoidance when the sweeping robot moves to the place for the next time. In this embodiment, the robot may be provided with a touch-sensitive display or controlled by a mobile terminal, so as to receive an operation instruction input by a user. The automatic cleaning apparatus may be provided with various sensors, such as a buffer, a cliff sensor, an ultrasonic sensor, an infrared sensor, a magnetometer, an accelerometer, a gyroscope, and an odograph (a specific structure of each sensor is not described in detail, and any one of the sensors may be applied to the automatic cleaning apparatus), and may further be provided with a wireless communications module such as a Wi-Fi module and a Bluetooth module to connect to an intelligent terminal or a server, and receive, through the wireless communications module, the operation instruction transmitted by the intelligent terminal or the server.

Figure 2:
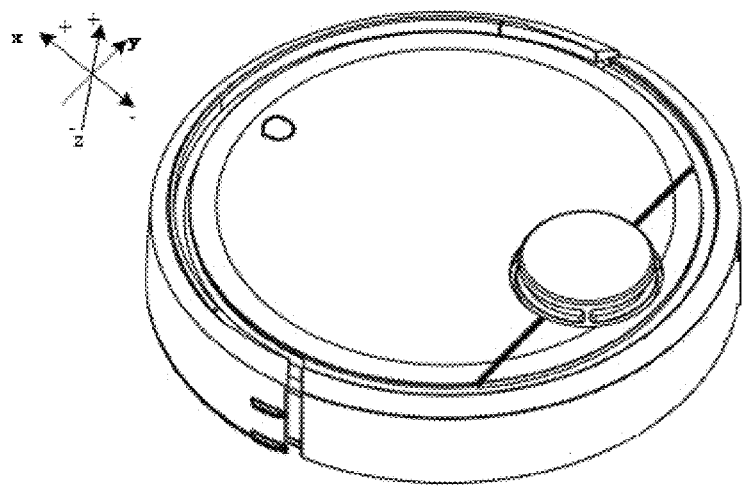
FIG. 2 is a three-dimensional structural view of a self-moving robot according to an embodiment of the present disclosure.

As illustrated in FIG. 2, an automatic cleaning apparatus 100 may travel on the ground with various combinations of the movement with respect to the following three mutually perpendicular axes defined by a body 110: a front and rear axis X, a lateral axis Y, and a central vertical axis Z. The forward drive direction along the front and rear axis X is labeled as "forward", and the backward drive direction along the front and rear axis X is labeled as "backward". The direction of the lateral axis Y is essentially a direction that passes through an axis defined by the center point of a drive wheel module 41 and extends between the right wheel and the left wheel of the robot.

The automatic cleaning apparatus 100 can rotate around the Y-axis. When the front part of the automatic cleaning apparatus 100 is tilted upward, and the back part is tilted downward, this case is referred to as "pitch up"; and when the front part of the automatic cleaning apparatus 100 is tilted downward, and the back part is tilted upward, this case is referred to as "pitch down". In addition, the automatic cleansing apparatus 100 may rotate around the Z-axis. In the forward direction of the automatic cleaning apparatus 100, when the automatic cleaning apparatus 100 is tilted to the right side of the X-axis, it rotates rightward, and when the automatic cleaning apparatus 100 is tilted to the left side of the X-axis, it rotates leftward.

Figure 3:
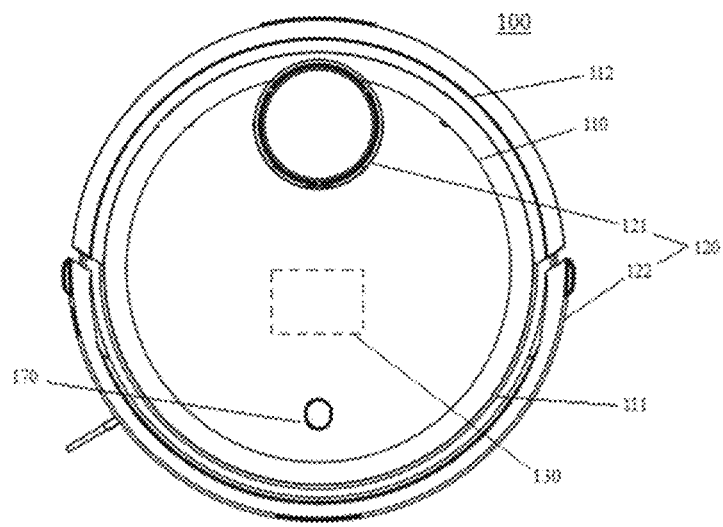
FIG. 3 is a top view of a structure of a self-moving robot according to an embodiment of the present disclosure.

As illustrated in FIG. 3, the automatic cleaning apparatus 100 includes a machine body 110, a sensing system 120, a control system, a drive system 140, a cleaning system, an energy system, and a human-machine interaction system 180.

The machine body 110 includes a front part 111 and a back part 112, and has a substantially circular shape (circular shape in both the front and back parts), or may have other shapes, including but not limited to an approximately D shape of a rectangular front part and a circular back part, a rectangle of a rectangular front part and a rectangular back part, or a square shape.

As illustrated in FIG. 3, the sensing system 120 includes a location determining device 121 disposed on the machine body 110, a collision sensor and a proximity sensor that are disposed on a buffer 122 of the front part 111 of the machine body 110, a cliff sensor disposed on a lower part of the machine body, and sensor devices such as a magnetometer, an accelerometer, a gyro, an odograph (ODO) that are disposed inside the machine body, which are configured to provide various pieces of location information and motion state information of the machine to the control system 130. The location determining device 121 includes but is not limited to a camera and a laser direct structuring (LDS) device.

As illustrated in FIG. 3, the front part 111 of the machine body 110 may carry the buffer 122. When the drive wheel module 141 drives the robot to move on the ground during cleaning, the buffer 122 detects one or more events in a driving path of the automatic cleaning apparatus 100 through a sensor system such as an infrared sensor disposed thereon, and the automatic cleaning apparatus 100 may control, based on the events detected by the buffer 122 such as an obstacle or a wall, the drive wheel module 141, causing the automatic cleaning apparatus 100 to respond to the events, such as keeping away from the obstacle.

The control system 130 is disposed on a circuit board in the machine body 110, and includes a computing processor, such as a central processing unit and an application processor, in communication with a non-transitory memory, such as a hard disk, a flash memory, and a random access memory. According to obstacle information fed back by the LDS device, the application processor draws an instant map in an environment in which the robot is located through a locating algorithm, such as simultaneous localization and mapping (SLAM). In addition, with reference to distance information and speed information that are fed back by the sensor devices such as the sensors disposed on the buffer 122, the cliff sensor, the magnetometer, the accelerometer, the gyroscope, and the odograph, the control system comprehensively determines a current working state, a location, and a current posture of the sweeping robot, such as crossing a doorsill, climbing onto a carpet, locating at a cliff, being stuck at the top or the bottom, a dust box being full, and being picked up. In addition, the control system may provide a specific next action policy for various cases, so that operation of the robot better meets a requirement of the user and has better user experience.

Figure 4:
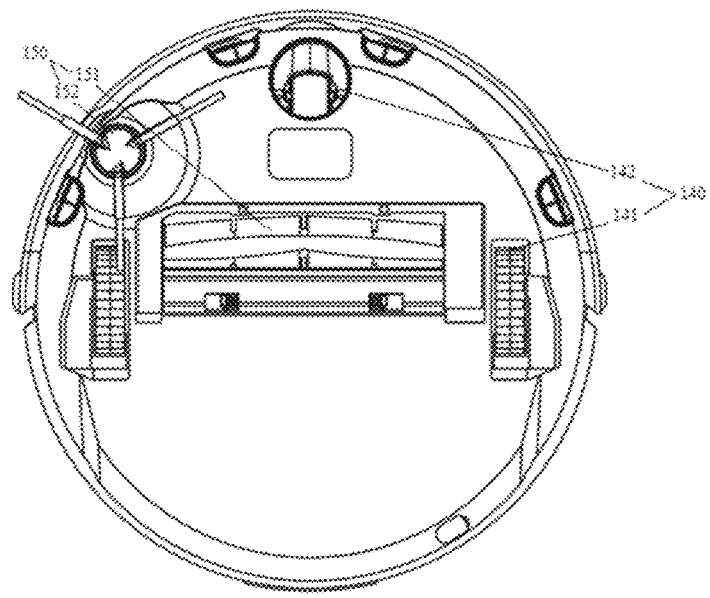
FIG. 4 is a bottom view of a structure of a self-moving robot according to an embodiment of the present disclosure.

As illustrated in FIG. 4, the drive system 140 may operate the automatic cleansing apparatus 100 to cross the ground based on a drive command with distance and angle information (for example, x, y, and θ components). The drive system 140 includes the drive wheel module 141. The drive wheel module 141 may control both the left wheel and the right wheel at the same time. To control movement of the cleaning robot more accurately, the drive wheel module 141 includes a left drive wheel module and a right drive wheel module. The left and right drive wheel modules are opposed to each other along a lateral axis defined by the body 110. To enable the robot to move more stably or more robustly on the ground, the robot may include one or more driven wheels 142, and the driven wheels include but are not limited to universal wheels. The drive wheel module includes a moving wheel, a driving motor, and a control circuit configured to control the drive motor. The drive wheel module may further be connected to both a circuit configured to measure a drive current and an odograph. The drive wheel module 141 may be detachably connected to the machine body 110, so as to facilitate disassembly and maintain. The drive wheel may have an offset drop suspension system, which is fixed to the machine body 110 in a moveable manner, for example, attached to the machine body 110 in a rotatable manner, and receives a spring offset that is offset downward and away from the machine body 110. The spring offset enables the drive wheel to maintain contact with the ground and traction with respect to the ground with a grounding force, and a cleaning element of the automatic cleaning apparatus 100 also contacts the ground 10 with a pressure.

The cleaning system may be a dry cleaning system and/or a wet cleaning system. As a dry cleaning system, a primary cleaning function is derived from a cleaning system 151 formed by a brushroll, a dust box, a fan, an air outlet, and connection parts connecting the four. The brushroll that interferes with the ground sweeps rubbish on the ground and rolls it to the front of a suction port between the brushroll and the dust box. Then, the rubbish is suctioned into the dust box by suction air generated by the fan and passing through the dust box. The dry cleaning system may further include a side brush 152 having a rotation shaft that is angled relative to the ground and is configured to move debris into a brushroll region of the cleaning system.

The energy system includes a rechargeable battery, such as a Ni-H battery and a lithium battery. The rechargeable battery may be connected to a charging control circuit, a charging temperature detection circuit of a battery pack, and a battery under-voltage monitoring circuit. The charging control circuit, the charging temperature detection circuit of the battery pack, and the battery under-voltage monitoring circuit are further connected to a single-chip control circuit. The cleaning robot is charged by connecting to a charging pile by using a charging electrode disposed on a side or at the bottom of the machine body. If dust is deposited on the exposed charging electrode, a plastic body around the electrode may be melted and deformed due to a charge accumulation during charging; and even the electrode itself is deformed, and the cleaning robot cannot be charged properly.

The human-machine interaction system 180 includes buttons disposed on a panel, and the buttons are configured for the user to select a function; may further include a display screen and/or an indicating lamp and/or a speaker, wherein the display screen, the indicating lamp, and the speaker present a current state or function selection item of the machine to the user; and may further include a mobile phone client program. For a path navigation type automatic cleaning apparatus, a mobile phone client can display a map of an environment in which the automatic cleaning apparatus is located and a location of the machine to the user, so as to provide a more enriched and humanized function item to the user.

According to the obstacle avoidance method for the cleaning robot according to this embodiment of the present disclosure, the cleaning robot obtains, during traveling, obstacle information in a traveling route in real time through the sensor or the image obtaining device of the robot, and labels the obstacle information in the working map. When it is subsequently manually determined that some types of obstacles are not required to be avoided, an ignoring operation may be performed. An obstacle avoidance operation is not performed on these types of obstacles any more in the subsequent cleaning process.

Figure 5:
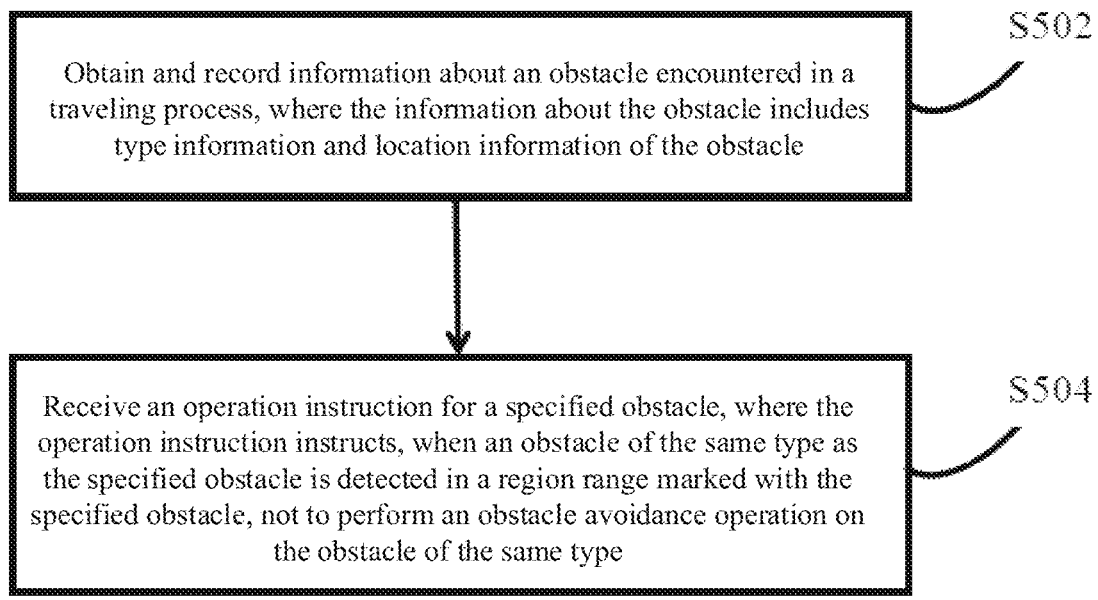
FIG. 5 is a schematic flowchart of an obstacle avoidance method for a self-moving robot according to an embodiment of the present disclosure.

In one implementation, as illustrated in FIG. 5, an embodiment of the present disclosure provides an obstacle avoidance method for a self-moving robot, which is applied to a robot side and includes the following method steps.

In step S502, information of an obstacle encountered during travelling is acquired and recorded, wherein the information of the obstacle includes type information and location information of the obstacle.

The obstacle refers to any object that may prevent the robot from moving. As described above, the automatic cleaning apparatus includes a collision sensor, a proximity sensor, a cliff sensor, and a sensor device such as a magnetometer, an accelerometer, a gyro, and an odograph (ODO) that are disposed inside a machine body. These sensors provide various pieces of location information and motion status information of the machine to a control system 130 at a fixed frequency. The control system 130 obtains various sensor parameters of the automatic cleaning apparatus in a traveling process in real time, and further determines and analyzes a current location and working status of the automatic cleaning apparatus.

The automatic cleaning apparatus shoots an image in real time through a camera carried by the automatic cleaning apparatus during traveling, where image information may be complete photo information, or may be feature information extracted from the image to reflect an object in the image, for example, image information obtained after extracting a feature point. For example, the feature information includes abstract features of the image, such as a corner, an object boundary line, a color gradient, an optical flow gradient, and a location relationship between features. The control system 130 obtains image information parameters of the automatic cleaning apparatus in real time during traveling, and further analyzes and determines the current location and operation status of the automatic cleaning apparatus.

The information of the obstacle includes the type information of the obstacle and the location information of the obstacle. The type information of the obstacle refers to a category that the obstacle is identified as, and which is an identification result of a sensor or an image identification device according to a preset identification classification. The classification includes but is not limited to a power strip bar, a pedestal, excrement, a weight scale, a clew, a shoe, and a fixed object (for example, a sofa, a bed, a table, and a chair). The control system classifies obstacles according to different features of the obstacles obtained by the sensor or the image identification device. For example, if an image is photographed by the image identification device, the control system automatically classifies obstacles according to obstacle labels, or the obstacles may be identified as fixed objects according to a collision strength and a collision location that are received by a collision sensor.

The location information of the obstacle includes location information labeled in a working map of the robot according to a specific location of the identified obstacle, for example, a coordinate location. The working map is region information generated by the cleaning robot according to a working region. The working map may be obtained by external inputs after the cleaning robot arrives at the working region, or may be automatically obtained by the cleaning robot in multiple working processes. The working map typically includes partitions formed according to architectural features of the working region, such as a bedroom region, a living room region, and a kitchen region of a home; and a corridor region, a work region, and a rest region of an office region.

As an example, the obstacle information may be obtained by the image obtaining device through obtaining image information in real time during traveling. When the image information meets a preset model condition, it is determined that there is an obstacle at a current location, and a category is labeled according to a preset model, which specifically includes a following process. In the traveling process, the robot obtains image information in real time during the traveling, when there is an obstacle image, the obstacle image is compared with an image model trained by the robot, and an identified obstacle is classified according to a comparison result. For example, when an image of "shoe" is shot, the image is matched with models of multiple types stored by the robot, and when a proportion that the image is matched with "shoe" is higher, the image is classified as a shoe. Certainly, if identification is not clear through the obstacle image, image identification may be performed on the obstacle from multiple angles. For example, when a probability that a front ball-like object is identified as a clew is 80%, a probability that the front ball-like object is identified as excrement is 70%, and a probability that the front ball-like object is identified as a ball is 75%, the three probabilities are relatively approximate to each other and it is difficult for the object to be classified. The robot may choose to obtain image information from another angle to perform a second identification until the robot can identify the object as a certain category with a relatively large probability difference. For example, the probability that the object is identified as a clew is 80%, and the probabilities that the object is identified as other objects are all below 50%, then the obstacle is classified as a clew.

The obstacle image information refers to information through which it can be determined that the robot is trapped, and includes but is not limited to image information obtained by the image obtaining device of the cleaning robot, radar information obtained by a radar system, and the like. The automatic cleaning apparatus shoots an image in real time during traveling through a camera carried by the automatic cleaning apparatus, wherein image information may be complete photo information, or may be feature information extracted from the image to reflect the image, for example, image information obtained after extracting a feature point. For example, the feature information includes abstract features of the image, such as a corner, an object boundary line, a color gradient, an optical flow gradient, and a location relationship of the features.

After a coordinate point of the obstacle location is labeled as an obstacle, a region with a certain area and shape around the obstacle location is selected as an obstacle region; and the obstacle is located in the obstacle region. In specific implementation, the foregoing range may be a circular region with a preset length as a radius and the coordinate point labeled as an obstacle as the center, or may be a quadrilateral with the coordinate point labeled as an obstacle as the center and a preset length as an edge length. The length of the radius and the edge length may be fixed, or may be set to different values according to various types of obstacles.

During the traveling, the robot may determine, through the foregoing image sensor, whether there is an obstacle at a current location. When there is an obstacle, the location coordinates are labeled on a working map, and type information of the obstacle is recorded in combination with an image device, wherein the type information of the obstacle includes but is not limited to a power strip bar, a pedestal, excrement, a weight scale, a clew, a shoe, and a fixed object (for example, a sofa, a bed, a table, and a chair).

In step S504, an operation instruction for a specified obstacle is received, wherein the operation instruction instructs, when detecting an obstacle of a same type as the specified obstacle in a region range labeled with the specified obstacle, not to perform an obstacle avoidance operation on the obstacle of the same type.

In an example, receiving the operation instruction for the specified obstacle specifically includes: receiving the operation instruction for ignoring the specified obstacle sent from a user through a human-machine interaction interface. The human-machine interaction interface includes but is not limited to a mobile phone APP interface, a human-machine interaction interface of the robot, a voice interaction interface, and the like. The specified obstacle includes, for example, one or more of a socket, a pedestal, excreta, a weight scale, a clew, a shoe, and a fixed object.

In an example, the operation instruction includes type information and location information of the specified obstacle, specifically, may be an instruction for an obstacle of certain type at a certain location, for example, an instruction for excreta in a living room; or may be an instruction for obstacles of certain types at a certain location, for example, an instruction for excreta and a socket in a living room; or may be an instruction for an obstacle of a certain type at certain locations, for example, an instruction for excreta in a living room and a bedroom.

As an example, after encountering an obstacle in the traveling process, the robot allocates an identifier to the obstacle, for example, allocates different identifiers to different obstacles such as a socket, a pedestal, excreta, a weight scale, a clew, a shoe, and a fixed object, and the identifier may be displayed on an operation interface of a mobile phone. The operation instruction includes an identifier of the specified obstacle; and after the operation instruction for the specified obstacle is received, corresponding type information and location information are searched for according to the identifier of the specified obstacle.

Content of the instruction may be as follows: when an obstacle of the same type as the specified obstacle is detected in a region range labeled with the specified obstacle, no obstacle avoidance operation is performed on the obstacle of the same type. The region range may be a range at a certain distance from the location where the specified obstacle is labeled; or may be a zone where the specified obstacle is labeled, for example, an ignoring instruction is indicated for any obstacle marked with excreta detected in a bedroom; or may be all regions accessible by the robot, that is, no obstacle avoidance operation is to be performed on the obstacle of the same type in the entire space.

In an embodiment, detecting the obstacle of the same type as the specified obstacle in the region range labeled with the specified obstacle specifically includes: matching a type of a detected obstacle with a type of the specified obstacle; and if the matching succeeds, confirming that the obstacle of the same type as the specified obstacle is detected.

The region range includes a region with a fixed size and shape with a coordinate location of the specified obstacle as a geometric center; or a zone where the obstacle is located, where the zone is automatically divided by the self-moving robot or is manually divided by the user.

In an example, the region range includes a circle that takes the coordinate location labeled with the obstacle information as a center and a fixed length as the radius; or a zone where the coordinate location labeled with the obstacle information is located, where the zone is a region divided according to the working map. In a specific implementation process, an ignored range may be a circle that takes the coordinate point as the center and a fixed length as the radius, preferably 50 cm. For a sweeping robot that has a region dividing capability, the ignored range may be a zone where the coordinate point is located, for example, a mark for slipper in a bedroom is ignored; or in the entire cleaning space, shoes are ignored.

When the moving robot travels within a region range (for example, a circle with a radius of 50 cm) labeled with the specified obstacle (for example, a shoe), the moving robot matches a type of an obstacle detected in real time with the type of the specified obstacle, for example, determines whether a type of the currently detected obstacle is a shoe, and if the matching succeeds, determines that the obstacle of the same type as the specified obstacle is detected, and performs an ignoring operation.

In another embodiment, detecting the obstacle of the same type as the specified obstacle in the region range labeled with the specified obstacle specifically includes: matching a type of a detected obstacle with a type of the specified obstacle; and if the matching succeeds, determining whether the obstacle is located within the region range labeled with the specified obstacle; and if yes, determining that the obstacle of the same type as the specified obstacle is detected in the region range labeled with the specified obstacle.

In the moving process, the moving robot obtains obstacle information in an identification capability range in real time, and matches a type of a detected obstacle with the type of the specified obstacle (for example, a shoe); if the matching succeeds, it indicates that the obstacle type is a shoe and belongs to the type of the specified obstacle, and then determines whether the obstacle is located within the region range labeled with the specified obstacle; and if yes, determines that the obstacle of the same type as the specified obstacle is detected in the region range labeled with the specified obstacle, and performs an ignoring operation.

Figure 6:
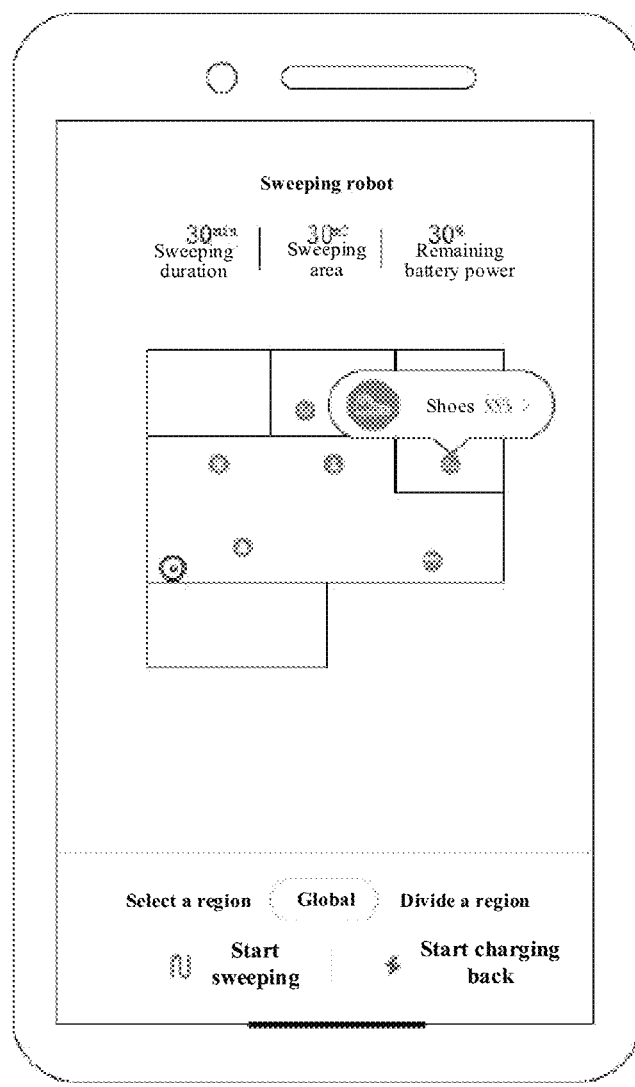
FIG. 6 is a schematic configuration diagram of an obstacle avoidance APP of a self-moving robot according to an embodiment of the present disclosure.

In the sweeping process or after the sweeping process, a corresponding location on a sweeping map of the APP displays the type of an obstacle identified by the sweeping robot in the current sweeping process. As illustrated in FIG. 6, the type of the obstacle includes but is not limited to a socket, a pedestal, excreta, a weight scale, a clew, a shoe, and a fixed object (for example, a sofa, a bed, a table, and a chair). In this case, the user may manually operate the obstacles. For example, the user may choose to ignore at least one of the obstacles, and label an operation instruction for ignoring the obstacle on the working map. After detecting the user's operation instruction for ignoring a certain obstacle at a certain location, the robot records the type and coordinates of the obstacle. In a subsequent cleaning process, if the sweeping robot detects this type of obstacle within a certain coordinate range, the obstacle mark is ignored, that is, this type of obstacle is not considered to appear at the location, and no obstacle avoidance operation is to be performed on the obstacle. For example, the user selects an ignoring operation for a slipper mark at a certain location in a bedroom, and thereafter, when the cleaning robot moves near the mark, the cleaning robot keep cleaning without performing obstacle avoidance. Alternatively, when the cleaning robot moves to the bedroom region in which the mark is located, no obstacle avoidance is required to be performed on the slipper mark.

According to the obstacle avoidance method for the robot provided in this embodiment of the present disclosure, in the traveling process, the robot automatically obtains obstacle information during traveling by using the sensor or the image obtaining device of the robot, and labels the type and location of the obstacle. After the obstacle information is manually confirmed, when this type of obstacle information is encountered again, obstacle avoidance or sweeping is performed accordingly, thereby avoiding missed sweeping in the cleaning region caused by blind obstacle avoidance, improving cleaning accuracy, and improving user experience.

Figure 7:
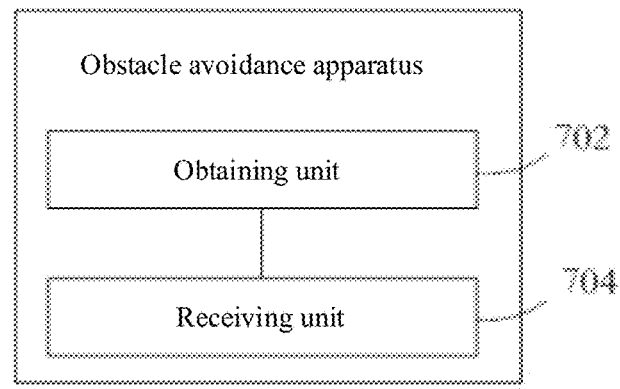
FIG. 7 is a schematic structural diagram of an obstacle avoidance device for a self-moving robot according to an embodiment of the present disclosure.

In one implementation, as illustrated in FIG. 7, an embodiment of the present disclosure provides an obstacle avoidance device for a robot, applied to a robot side and including:

an obtaining unit 702, configured to obtain and record information of an obstacle encountered during travelling, wherein the information of the obstacle includes type information and location information of the obstacle; and a receiving unit 704, configured to receive an operation instruction for a specified obstacle, wherein the operation instruction instructs, when detecting an obstacle of a same type as the specified obstacle in a region range labeled with the specified obstacle, not to perform an obstacle avoidance operation on the obstacle of the same type.

Optionally, detecting the obstacle of the same type as the specified obstacle in the region range labeled with the specified obstacle specifically includes: matching a type of a detected obstacle with a type of the specified obstacle; and if the matching succeeds, determines that the obstacle of the same type as the specified obstacle is detected.

Optionally, detecting the obstacle of the same type as the specified obstacle in the region range labeled with the specified obstacle specifically includes: matching a type of a detected obstacle with a type of the specified obstacle; and if the matching succeeds, determining whether the obstacle is in the region range labeled with the specified obstacle; and if yes, confirming that the obstacle of the same type as the specified obstacle is detected in the region range labeled with the specified obstacle.

Optionally, receiving the operation instruction for the specified obstacle specifically includes: receiving the operation instruction for ignoring the specified obstacle sent from a user through a human-machine interaction interface.

Optionally, the operation instruction includes type information and location information of the specified obstacle.

Optionally, the device further includes: a unit, configured to: allocate, after encountering the obstacle during travelling, an identifier to the obstacle, wherein the operation instruction includes an identifier of the specified obstacle; and a unit, configured to: search, after receiving the operation instruction for the specified obstacle, for corresponding type information and location information according to the identifier of the specified obstacle.

Optionally, the region range includes a region with a fixed size and shape and with a coordinate location of the specified obstacle as a geometric center; or a zone where the obstacle is located, wherein the zone is automatically divided by the self-moving robot or is manually divided by the user; or all regions accessible by the self-moving robot.

According to the obstacle avoidance device for the robot provided in this embodiment of the present disclosure, the robot automatically obtains obstacle information during traveling by using the sensor or the image obtaining device of the robot, and labels the type and location of the obstacle. After the obstacle information is manually confirmed, when this type of obstacle information is encountered again, obstacle avoidance is performed accordingly, thereby avoiding missed sweeping in the cleaning region caused by blind obstacle avoidance, improving cleaning accuracy, and improving user experience.

An embodiment of the present disclosure provides a non-transitory computer readable storage medium, in which a computer program instruction is stored, and the computer program instruction implements operations of the foregoing method steps when being invoked and executed by a processor.

An embodiment of the present disclosure provides a robot, including a processor and a memory, where the memory stores a computer program instruction that can be executed by the processor, and the processor implements operations of the method of any of the foregoing embodiments when executing the computer program instruction.

Figure 8:
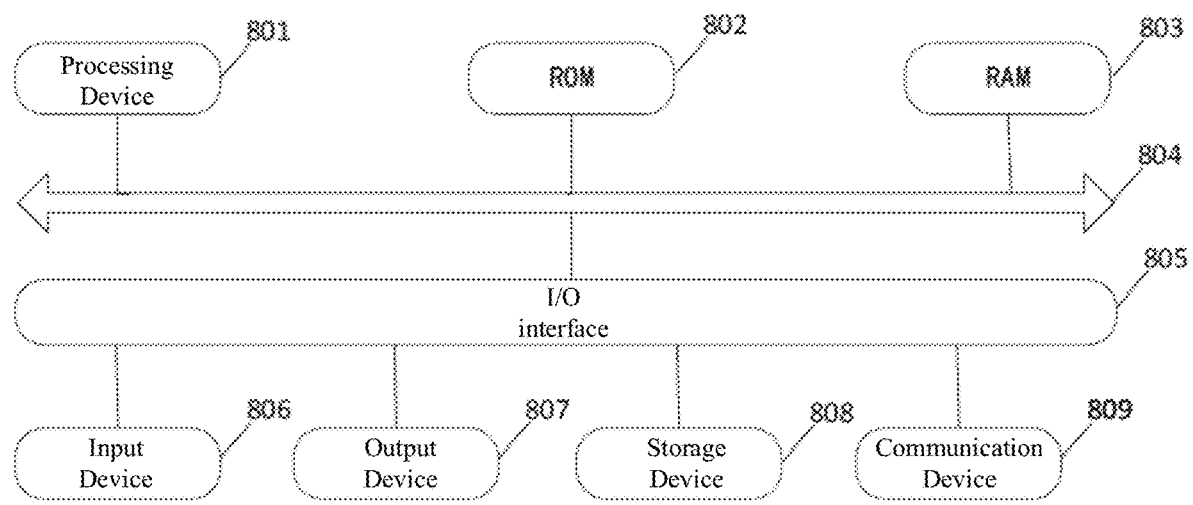
FIG. 8 is a schematic diagram of an electronic structure of a robot according to an embodiment of the present disclosure.

As illustrated in FIG. 8, the robot may include a processing device (such as a central processing unit, a graphics processing unit, or the like) 801 that may perform various appropriate actions and processing according to a program stored in a read-only memory (ROM) 802 or a program loaded from a storage device 808 into a random access memory (RAM) 803. In the RAM 803, various programs and data required for operation of an electronic robot 800 are further stored. The processing device 801, the ROM 802, and the RAM 803 are connected to each other by a bus 804. An input/output (I/O) interface 805 is also connected to the bus 804.

Generally, the following devices may be connected to the I/O interface 805: input devices 806 including, for example, a touchscreen, a touchpad, a keyboard, a mouse, a camera, a microphone, an accelerometer, and a gyroscope; output devices 807 including, for example, a liquid crystal display (LCD), a loudspeaker and a vibrator; storage devices 808 including, for example, a hard disk; and a communications device 809. The communications device 809 may allow the electronic robot to communicate wirelessly or through a wired connection with another robot to exchange data. Although FIG. 8 illustrates an electronic robot with various devices, it should be understood that it is not required to implement or provide all illustrated devices. Alternatively, more or fewer devices may be implemented or provided.

In particular, according to the embodiments of the present disclosure, the process described above with reference to the flowchart may be implemented as a software program of the robot. For example, an embodiment of the present disclosure includes a robot software program product that includes a computer program carried on a readable medium, and the computer program includes program code used to perform the method illustrated in the flowchart. In such an embodiment, the computer program may be downloaded and installed from a network by using the communications device 809, installed from the storage device 808, or installed from the ROM 802. When the computer program is executed by the processing device 801, the foregoing functions defined in the method in the embodiments of the present disclosure are executed.

It should be noted that the foregoing computer readable medium in the present disclosure may be a computer readable signal medium, a computer readable storage medium, or any combination of the two. The computer readable storage medium may be, for example, an electrical, magnetic, optical, electromagnetic, infrared, or semiconductor system, apparatus, or device, or any combination thereof. More specific examples of the computer readable storage medium may include but are not limited to: an electrical connection having one or more conducting wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer readable storage medium may be any tangible medium that includes or stores a program, and the program may be used by or in combination with an instruction execution system, apparatus, or device. In the present disclosure, the computer readable signal medium may include a data signal propagated in a baseband or as a part of a carrier, which carries computer readable program code. Such a propagated data signal may be in multiple forms, including but not limited to an electromagnetic signal, an optical signal, or any suitable combination thereof. The computer readable signal medium may further be any computer readable medium other than the computer readable storage medium, and the computer readable signal medium may send, propagate, or transmit a program that is used by or in combination with an instruction execution system, apparatus, or device. The program code included in the computer readable medium may be transmitted by using any suitable medium, including but not limited to: a wire, an optical cable, a radio frequency (RF), or any suitable combination thereof.

The computer readable medium may be included in the foregoing robot, or may exist separately and not be assembled into the robot.

Computer program code for performing the operations of the present disclosure may be written in one or more programming languages or a combination thereof, such as object-oriented programming languages Java, Smalltalk, C++, and conventional procedural programming languages such as "C" or similar program design languages. The program code may be executed completely on a user computer, partially on a user computer, as an independent package, partially on a user computer and partially on a remote computer, or completely on a remote computer or server. In cases involving a remote computer, the remote computer may be connected to a user computer through any type of network, including a local area network (LAN) or a wide area network (WAN), or may be connected to an external computer (for example, through the Internet by using an Internet service provider).

Flowcharts and block diagrams in the accompanying drawings illustrate possible architectures, functions, and operations of systems, methods, and computer program products according to various embodiments of the present disclosure. In this regard, each block in a flowchart or block diagram may represent a module, program segment, or part of code that includes one or more executable instructions for implementing a specified logical function. It should also be noted that in some alternative implementations, functions marked in the block may also occur in different order than those marked in the accompanying drawings. For example, two blocks represented in succession may actually be executed in substantially parallel, and they may sometimes be executed in reverse order, depending on the functions involved. It should also be noted that each block in the block diagram and/or flowchart and a combination of blocks in the block diagram and/or flowchart may be implemented by using a dedicated hardware-based system that performs a specified function or operation, or may be implemented by using a combination of dedicated hardware and a computer instruction.

The apparatus embodiment described above is merely an example. The units described as separate parts can or cannot be physically separate, and parts displayed as units can or cannot be physical units, can be located in one location, or can be distributed on a plurality of network units. Some or all of the modules can be selected based on an actual need to implement the solutions of the embodiments. A person of ordinary skill in the art can understand and implement the embodiments of the present application without creative efforts.

Finally, it should be noted that the previous embodiments are merely intended for describing the technical solutions of the present disclosure, but not for limiting the present disclosure. Although the present disclosure is described in detail with reference to the previous embodiments, persons of ordinary skill in the art should understand that they can still make modifications to the technical solutions described in the previous embodiments or make equivalent replacements to some technical features thereof, without departing from the spirit and scope of the technical solutions of the embodiments of the present disclosure.

What is claimed is:

1. An obstacle avoidance method for a self-moving robot, comprising:
   obtaining and recording, by the self-moving robot, information about an obstacle encountered during traveling, wherein the information about the obstacle comprises type information and location information of the obstacle; and
   receiving, by the self-moving robot, an operation instruction for ignoring a specified obstacle sent from a human-machine interaction interface, wherein the operation instruction is configured for instructing the self-moving robot, when detecting an obstacle of a same type as the specified obstacle in a region range labeled with the specified obstacle, to keep cleaning without performing an obstacle avoidance operation on the obstacle of the same type, and the operation instruction comprises type information and location information of the specified obstacle,
   wherein detecting the obstacle of the same type as the specified obstacle in the region range labeled with the specified obstacle comprises:
   matching a type of a detected obstacle with a type of the specified obstacle;
   in response to that the matching succeeds, determining whether the obstacle is in the region range labeled with the specified obstacle; and
   in response to determining the obstacle is in the region range, confirming that the obstacle of the same type as the specified obstacle is detected in the region range labeled with the specified obstacle,
   wherein the region range comprises a zone in which the obstacle is located, and the zone is automatically divided by the self-moving robot or is manually divided by a user.

2. The method according to claim 1, further comprising:
   allocating, after encountering the obstacle during traveling, an identifier to the obstacle, wherein the operation instruction comprises an identifier of the specified obstacle; and
   searching, after receiving the operation instruction, for corresponding type information and location information according to the identifier of the specified obstacle.

3. A self-moving robot, comprising a processor and a memory, wherein the memory stores a computer program instruction that can be executed by the processor, and when being executed by the processor, the computer program instruction implements actions comprising:
   obtaining and recording information about an obstacle encountered during traveling, wherein the information about the obstacle comprises type information and location information of the obstacle; and receiving an operation instruction for ignoring a specified obstacle sent from a human-machine interaction interface, wherein the operation instruction is configured for instructing the self-moving robot, when detecting an obstacle of a same type as the specified obstacle in a region range labeled with the specified obstacle, to keep cleaning without performing an obstacle avoidance operation on the obstacle of the same type, and the operation instruction comprises type information and location information of the specified obstacle, wherein detecting the obstacle of the same type as the specified obstacle in the region range labeled with the specified obstacle comprises:

matching a type of a detected obstacle with a type of the specified obstacle;

in response to that the matching succeeds, determining whether the obstacle is in the region range labeled with the specified obstacle; and in response to determining the obstacle is in the region range, confirming that the obstacle of the same type as the specified obstacle is detected in the region range labeled with the specified obstacle, wherein the region range comprises a zone in which the obstacle is located, and the zone is automatically divided by the self-moving robot or is manually divided by a user.

4. The robot according to claim 3, wherein the processor is further configured to:

allocate, after encountering the obstacle during traveling, an identifier to the obstacle, wherein the operation instruction comprises an identifier of the specified obstacle; and search, after receiving the operation instruction for the specified obstacle, for corresponding type information and location information according to the identifier of the specified obstacle.

5. A non-transitory computer readable storage medium, wherein a computer program instruction is stored, and the computer program instruction, when being invoked and executed by a processor, implements actions comprising:

obtaining and recording information about an obstacle encountered during traveling, wherein the information about the obstacle comprises type information and location information of the obstacle; and receiving an operation instruction for ignoring a specified obstacle sent from a human-machine interaction interface, wherein the operation instruction is configured for instructing a self-moving robot, when detecting an obstacle of a same type as the specified obstacle in a region range labeled with the specified obstacle, to keep cleaning without performing an obstacle avoidance operation on the obstacle of the same type, and the operation instruction comprises type information and location information of the specified obstacle, wherein detecting the obstacle of the same type as the specified obstacle in the region range labeled with the specified obstacle comprises:

matching a type of a detected obstacle with a type of the specified obstacle;

in response to that the matching succeeds, determining whether the obstacle is in the region range labeled with the specified obstacle; and in response to determining the obstacle is in the region range, confirming that the obstacle of the same type as the specified obstacle is detected in the region range labeled with the specified obstacle, wherein the region range comprises a zone in which the obstacle is located, and the zone is automatically divided by the self-moving robot or is manually divided by a user.

* * * * *